(12) United States Patent
Marin

(10) Patent No.: US 8,108,340 B2
(45) Date of Patent: Jan. 31, 2012

(54) SEARCH ENGINE CONFIGURED TO MINIMIZE PERFORMANCE DEGRADATION UNDER HIGH LOAD

(75) Inventor: Mauricio Marin, Santiago (CL)

(73) Assignee: Yahoo! Inc., Sunnyvale, CA (US)

( * ) Notice: Subject to any disclaimer, the term of this patent is extended or adjusted under 35 U.S.C. 154(b) by 403 days.

(21) Appl. No.: 12/058,385

(22) Filed: Mar. 28, 2008

(65) Prior Publication Data

US 2009/0248629 A1 Oct. 1, 2009

(51) Int. Cl.
*G06F 17/30* (2006.01)
(52) U.S. Cl. .......................................... 707/613; 707/720
(58) Field of Classification Search .................. 707/611, 707/613, 636, 706, 720
See application file for complete search history.

(56) References Cited

U.S. PATENT DOCUMENTS

| | | | | |
|---|---|---|---|---|
| 6,625,638 | B1 * | 9/2003 | Kubala et al. ................. | 718/105 |
| 6,704,766 | B1 * | 3/2004 | Goss et al. .................... | 718/104 |
| 7,308,023 | B1 * | 12/2007 | Blair et al. .................... | 375/212 |
| 7,716,214 | B2 * | 5/2010 | Li et al. .......................... | 707/719 |
| 2002/0143852 | A1 * | 10/2002 | Guo et al. ..................... | 709/201 |
| 2007/0219944 | A1 * | 9/2007 | Liu et al. .......................... | 707/2 |
| 2008/0086358 | A1 * | 4/2008 | Doshi et al. .................... | 705/10 |

OTHER PUBLICATIONS

M. Marin and G.V. Costa, "(SyncjAsync)+ MPI Search Engines", In EuroPVM/MPI 2007, Paris, France, Oct. 2007 (LNCS 4757, pp. 117-124).
M. Marin, C. Bonacic, G.V. Costa and C. Gomez, "A Search Engine Accepting On-Line Updates", In EuroPar 2007, Rennes, France, Aug. 2007 (LNCS 4641, pp. 340-349).
M. Marin and C. Gomez, "Load Balancing Distributed Inverted Files", In WIDM 2007, Lisbon, Portugal, Nov. 2007.
L. Valiant. A bridging model for parallel computation. Comm. ACM, 33:103-111, Aug. 1990.

* cited by examiner

*Primary Examiner* — Cam-Linh Nguyen
(74) *Attorney, Agent, or Firm* — Berkeley Law & Technology Group, LLP

(57) ABSTRACT

A search engine is operated to handle a plurality of queries. In particular, in response to each of the plurality of queries presented to the search engine, the search engine provides an indication of at least one document responsive to that query. An indication is determined of an amount of resources of the search engine to handle a subset of the plurality of queries. Based on the determined indication, the search engine is selected to operate in one of a synchronous mode and an asynchronous mode, and the search engine is operated in accordance with the selected mode.

22 Claims, 6 Drawing Sheets

US 8,108,340 B2

SEARCH ENGINE CONFIGURED TO MINIMIZE PERFORMANCE DEGRADATION UNDER HIGH LOAD

BACKGROUND

Search engines are faced with dynamic variations in the query traffic generated by users. Many frequent queries to a search engine may be answered quickly by keeping corresponding results stored in cache machines. However, results not found in cache are then generally directly resolved such as by a set of processors (nodes) forming a cluster. An aim is to determine the top-R results per query as quickly as possible and, from these results, build up the answer web pages presented to the users. For high query traffic and given the huge volume of data associated with the web samples kept at each node, this can involve the use of a significant amount of resources (such as processor utilization, disk and network bandwidth}. Current search engines deal with peaks in traffic by including hardware redundancy, typically enough so that at normal traffic, the processor utilization is below 30% or 40%.

Conventionally, search engines use a standard multiple master/slave paradigm to process queries arriving from broker machines. Typically, each query is associated with a different master thread that is in charge of producing query results, which in turn can contact slave threads located in other processors to get document information. This multi-threaded setting can result in significant performance degradation in situations of sustained high traffic of queries or even sudden peaks in traffic. This can lead to unstable behavior or increased query response times. The situation may be exacerbated when the on-line insertion of documents into the database and index is considered. In this scenario, dealing with a large number of threads can involve overhead from sources such as thread scheduling, costly thread to thread communication and synchronization, and control concurrency of readers and writers by means of locks.

SUMMARY

In accordance with an aspect, a search engine is operated to handle a plurality of queries. In particular, in response to each of the plurality of queries presented to the search engine, the search engine provides an indication of at least one document responsive to that query. An indication is determined of an amount of resources of the search engine to handle a subset of the plurality of queries. Based on the determined indication, the search engine is selected to operate in one of a synchronous mode and an asynchronous mode, and the search engine is operated in accordance with the selected mode.

DETAILED DESCRIPTION

Figure 1:
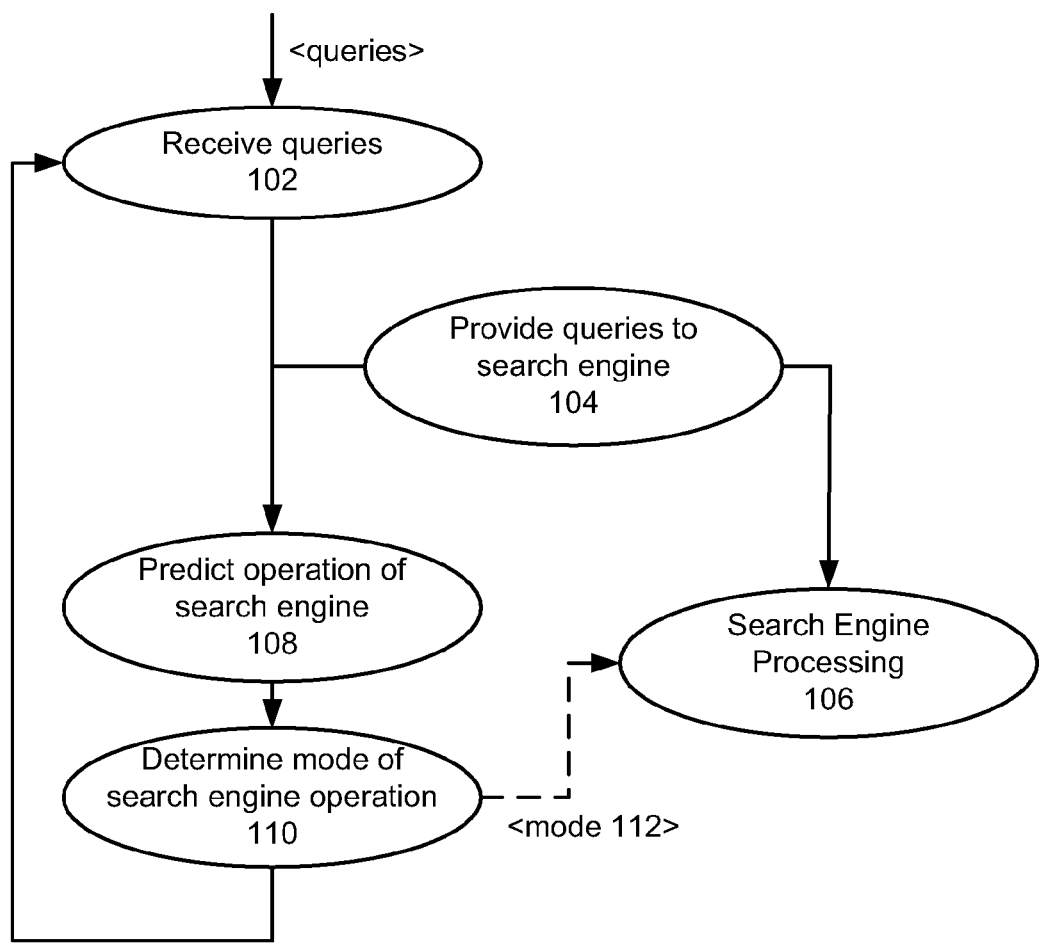
FIG. 1 is a flowchart illustrating a method, in accordance with a broad aspect of the invention, to control a search engine to automatically switch between synchronous and asynchronous modes of operation.

The inventor has realized that hardware redundancy (and the associated economic costs) can be reduced by using query processing strategies that take advantage of the economy of scale present in the situations in which a large number of queries are solved concurrently.

In one example, a search engine is configured to automatically switch between synchronous and asynchronous modes of operation. The synchronous mode is configured to minimize performance degradation due to intervals in which the query traffic is high. The asynchronous mode may be a standard mode employed by conventional search engines, which may be suitable for cases of low traffic of queries, as the asynchronous mode makes less efficient use of machine resources such as processors, disk and communication bandwidth due to overhead.

The switching between the two modes of operation, in one example, is facilitated by organizing overall query processing into the search engine. This method may include round-robin query processing. This method may allow the efficient use of (a) either the document or term partitioned inverted files, which are components of conventional search engines (b) simple strategies to perform concurrency control, which allows the search engine to be updated in an online manner while query processing is effected, and (c) heuristics and cost models to evenly load balance the work-load of processors.

For example, it has been found that, for a high-query traffic scenario, performing round-robin query processing (RRQP) implemented on top of bulk-synchronous parallel (BSP) processing can result in significant outperformance relative to standard multi-threaded asynchronous message passing parallel processing employed by conventional search engines. For low query traffic, the opposite generally holds true, which is logical since, in this case, resources are available such that individual queries can be granted as many threads they need, and those threads are kept alive consuming all necessary resources for the time it takes to get the top-R results. This is not harmful, since hardware is being under-utilized anyway because of the small number of queries being handled in the system. In one example, the processing switches between asynchronous and synchronous modes of operation, depending on the observed query traffic (more particularly, resources to handled the observed query traffic).

For cases of low or moderate query traffic, a conventional multiple master/slave paradigm may be applied for processing the queries. Throughout this description, this paradigm is referred to as the "async" mode of operation. However, when the query traffic increases, the search engine switches to a synchronous ("synch") mode of operation. Furthermore, a round-robin based approach may be applied in order to minimize unstable behavior resulting from processing the queries, demanding the use of a large amount of resources in computation, communication and disk accesses.

Thus, for example, the sync mode of operation may be a bulk-synchronous mode of operation. In accordance with a bulk-synchronous model, the query processing computation is organized as a sequence of supersteps. During a single superstep, the processors of the search engine (more generally, processing units) may perform computations on local data and/or cause messages to be sent to other processors. The messages are available for processing at the message destinations by the next superstep, and each superstep is ended with barrier synchronization of the processors. The underlying communication library ensures that all messages are available at their destinations before starting the next superstep.

The processing of queries may be performed sequentially in each superstep. This means that the number of participating threads can be reduced to a few ones in charge of tasks such as computation, communication and disk operations. Queries are processed in batches during a superstep, meaning that no locks are required to perform concurrency control among readers and writers. At the beginning of each superstep, there are no messages in transit and therefore it can be sufficient to use timestamps in readers and writers to avoid read/write conflicts. In addition, messages with a common destination can be packed together as a single message, which can reduce communication overhead since all messages are sent to their destinations at the end of each superstep. Furthermore, the supersteps may be used to divide the processing of each query into predictable and appropriate quanta of computation, communication and disk accesses. This can prevent queries requiring small amounts of resources from being delayed by queries requiring more resources. A query requiring a large amount of resources may be processed using several supersteps. When a query finishes processing, a new query may be injected in the batch of queries being processed. In this way, the round-robin principle acts across supersteps to allow queries to evenly share performance critical resources, including processors, disk and communication bandwidth.

As a result, in a situation of high traffic of search queries per unit time, the sync mode can lead to more efficient performance due to, for example, (a) the small number of active threads, reducing thread management overhead (b) the reduction in communication overhead, and (c) the round-robin access to the computational resources. The use of barrier synchronization of processors might be seen as a source of inefficiency. However, in a situation of high traffic of search queries, the amount of computation per processor demanded by the queries can quickly reduce the barrier synchronization computation overhead to far less than one percent of the total computation cost of the superstep.

In addition, the barrier synchronization requirement may be relaxed in an example in which each processor only needs to wait to receive one message from each processor to start a new superstep. In this example, individual messages associated with queries may be packed together into a single message per destination. By contrast, for search engines operating in asynchronous mode using a document partitioned inverted file, a broadcast operation is performed for every query being processed, which is equivalent to the operations involved in globally barrier synchronizing the processors. Empirical results with actual data and clusters confirm that performance is made more efficient.

We now describe more fully examples of search engine processing in which there is an automatic switch between synchronous and asynchronous modes of operation. In addition, we more fully describe examples of synchronous mode of operation.

FIG. 1 is a flowchart illustrating a method, in accordance with a broad aspect of the invention, of controlling a search engine to automatically switch between synchronous and asynchronous modes of operation. At 102, queries to the search engine are received. At 104, the queries are provided to the search engine processing 106. At 108, based on the received queries (in some examples, more precisely, based on the arrival rate of the received queries, which may include recent history with respect to received queries) and the available resources to process received queries, an indication of the operation of the search engine, to process the received queries, is predicted. At 110, based on the predicted operation of the search engine, the mode of operation is determined. The determined mode 112 is provided to the search engine processing 106.

As discussed above, in a bulk-synchronous parallel (BSP) model of parallel computing, computation is logically divided into a sequence of supersteps. During a superstep, the processors of a cluster may perform computations on local data and/or send messages to other processors. The messages are available for processing at their destinations during the next superstep, and each superstep is ended with the barrier synchronization of the processors. The underlying communication library ensures that all messages are available at their destinations before starting the next superstep.

The inverted index is a well-known data structure for supporting fast searches on very large text collections. An inverted index includes a vocabulary table and a set of posting lists. The vocabulary table contains the set of distinct relevant terms found in the collection. Each of these terms is associated with a posting list that includes the document identifiers identifying where the term appears in the collection, along with additional data used for ranking purposes. Generally, to solve a query, a set of documents associated with the query terms is accessed, and then the ranking of these documents is computed to select the top R documents as the query response.

A number of papers have been published reporting experiments and proposals for efficient parallel query processing of inverted files that are distributed on a set of P processor-memory pairs. Two dominant approaches to distribute an inverted index onto P processors are (a) a document partitioning strategy in which the documents are evenly distributed onto the processors and the inverted index is built in each processor using its respective subset of documents, and (b) a term partitioning strategy in which a single inverted index is built from the whole text collection to then distribute evenly the terms and their respective posting lists onto the processors.

Figure 2:
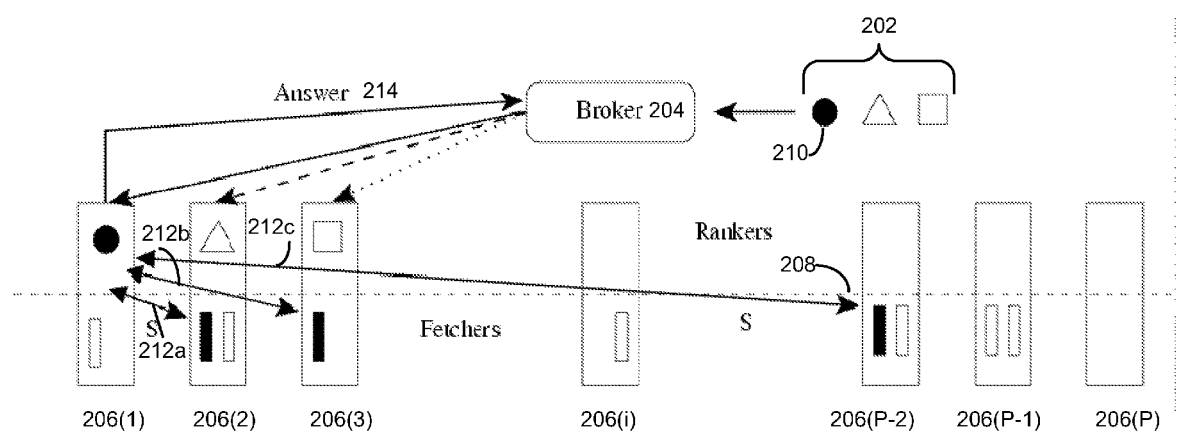
FIG. 2 illustrates an example of round-robin query processing, to distribute the workload for tasks of operating a search engine, in a round-robin manner.

We now describe, with reference to FIG. 2, an example of round-robin query processing, to distribute the workload of query processing and ranking in a round-robin manner. Queries 202 are provided to a receptionist machine 204 that is called a broker. In accordance with an example, the actions of fetching lists from the index is decoupled from the actions of ranking sets of documents, by distributing the ranking tasks in a circular manner. Each processor 206(1) to 206(P) has a dual role at all times: fetcher and ranker. In FIG. 2, this dual role is indicated by the dashed line 208.

In the fetching role, each processor 206 operates to fetch posting lists from its local index for a particular query. In the ranking role, each processor 206 operates to merge lists to compute the ranking associated with a query. The broker machine is in charge of assigning, in a fair manner such as in a circular manner, a processor to be the ranker for each query. The ranker then broadcasts the query to the correct "T" fetchers in the cluster of processors 206, where T may depend on the query and how the index is partitioned. The ranker later returns the corresponding answers to the broker.

Every query is then processed using two major steps: the first step, on each fetcher, includes sending an S-sized piece of every posting list involved in the received query to its ranker processor. The size S may be chosen such that the ranker processor gets about K documents in total for each term in the query. In the second step, the ranker processor performs the actual ranking of documents and, if necessary, requests additional S-sized pieces from the fetchers in order to produce the R best ranked documents, which are then passed to the broker as the query results (in one example, R=K/2). The value of S typically depends on the partitioning of the index.

FIG. 2 illustrates an example for T=3 for three queries 202, where the shading of the queries 202 indicate the corresponding lists. The query 210 is provided to the processor 206(1), which then requests S-sized pieces of the corresponding index from each of the processors 206(2), 206(3) and 206(P-2). The S-sized pieces are provided to the processor 206(1), which ranks the documents and provides an answer 214 to the broker 204.

In each step, the broker 204 may have Q>1 queries waiting to be processed. In that case, up to Q/P queries may be assigned to each ranker. This injection of new queries may happen at the beginning of every superstep to increase the parallelism. Under this scheme, for example, at a given interval of time, the processing of two or more queries can take place in parallel at different processors.

The discussion above is not restricted to a particular method of document ranking. In one example, the vector method is utilized for performing the ranking along with a filtering technique (such as is well-known) to reduce the posting list items scanned to produce the answers to queries. Consequently, the posting lists may be sorted by frequency in descending order.

In the document partitioning inverted file (D), the ranker performs a broadcast of each query to all processors. That is T=P. Notice that this implies that all queries are broadcast to all processors in two steps, distributing and parallelizing the broadcast operation. In conventional systems, all queries are broadcast from the broker, which can be less efficient. In one example, we use S=K/P. That is, all processors send about K/P pairs (doc id, frequency) of their posting lists to the ranker, which performs the final ranking. In the case of one or more query terms passing the posting list pruning filters, the ranker may send messages to all processors asking for an additional K/P pairs (doc id, frequency) of the respective posting lists. This is referred to as an iteration, such that the document ranking for a given query can take one or more iterations.

The particular values of the filter constants may be adjusted to produce the R results using only a few iterations on the average (such as, for example, one or two iterations). Before passing a set of K*P-sized lists of pairs (doc id, frequency) through the filters, all of the lists are merged into a single list sorted by decreasing frequency.

In the term partitioning approach (T), for the case in which no intersection of posting lists is performed during the query processing stage, we distribute the terms and their posting lists uniformly at random onto the processors (e.g., using the rule idterm mod P to determine in which processor is located a given term). In this scheme, for a given query, the ranker processor sends messages to the fetchers associated with every term present in the query asking for the first S=K pairs (doc id, frequency). That is, T is the number of terms in the query. This is repeated if one or more terms pass the filters in the ranking operation.

Figure 3:
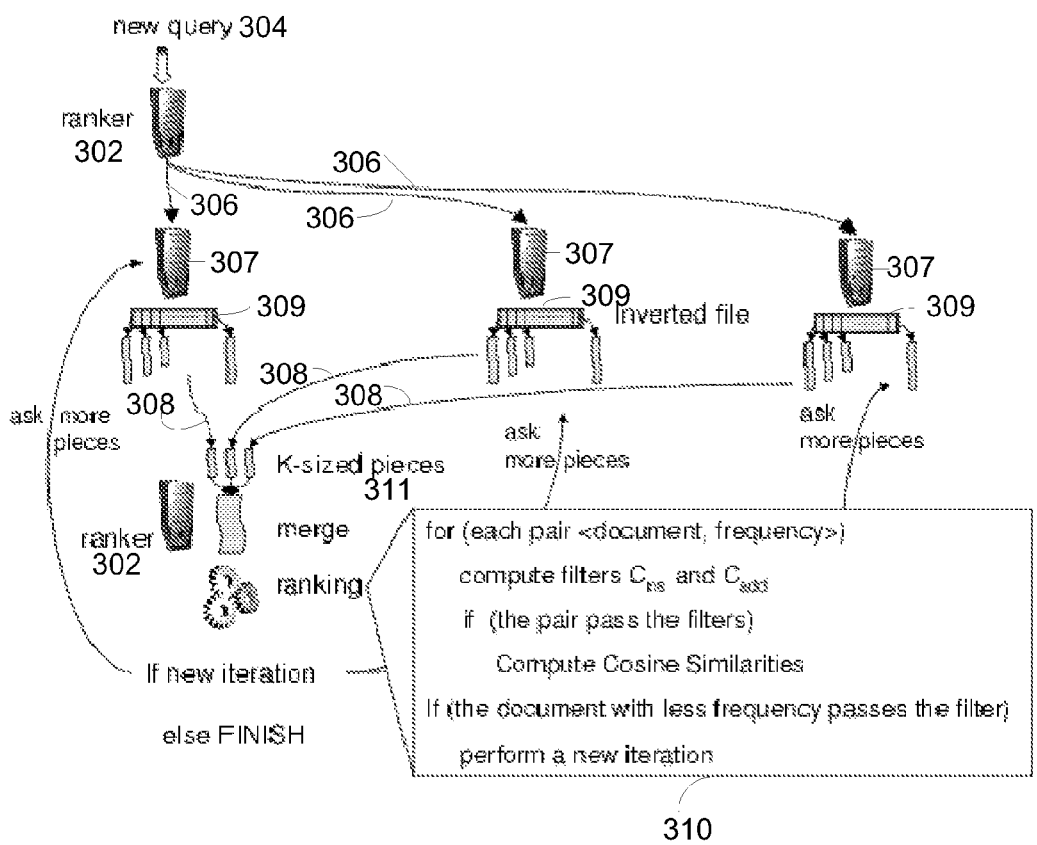
FIG. 3 illustrates an example of iterative ranking performed in an example query processing method.

FIG. 3 illustrates an example of the iterative ranking performed in an example query processing method. In FIG. 3, the constants Cins and Cadd are related to the filtering technique employed in the particular exhibited example implementation.

In accordance with the example, the round-robin principle for sharing processors, disks and communication bandwidth among the queries is implemented as follows. Query processing is divided into "atoms" of size K, and the atoms are scheduled in a round-robin manner across supersteps and processors. The tasks are each given a K sized quanta of processor time, communication network and disk accesses. These quanta are granted during supersteps, i.e., they are processed in a bulk-synchronous manner. Queries make use of one K-sized quantum in each superstep and if this is not enough to produce the answer, another quantum is granted in a next superstep. As all atoms are equally sized, then the net effect is that no particular task will restrain other tasks from using the resources. Once Q new queries are evenly injected onto the P processors, their processing is started in iterations as described above. At the end of the next or subsequent superstep, some queries, say n queries, all requiring a single iteration, will finish their processing and thereby at the next superstep "n" new queries can start their processing.

In summary, then, the ranker processor 302 for a given query 304 sends messages 306 to processors 307 holding posting lists 309 for the query terms 304, and these processors 307 reply 308 with pieces of posting lists to feed up to the ranker 302. A filtering criterium 310 is used to determine a new iteration where fetching and sending is again performed.

Figure 4:
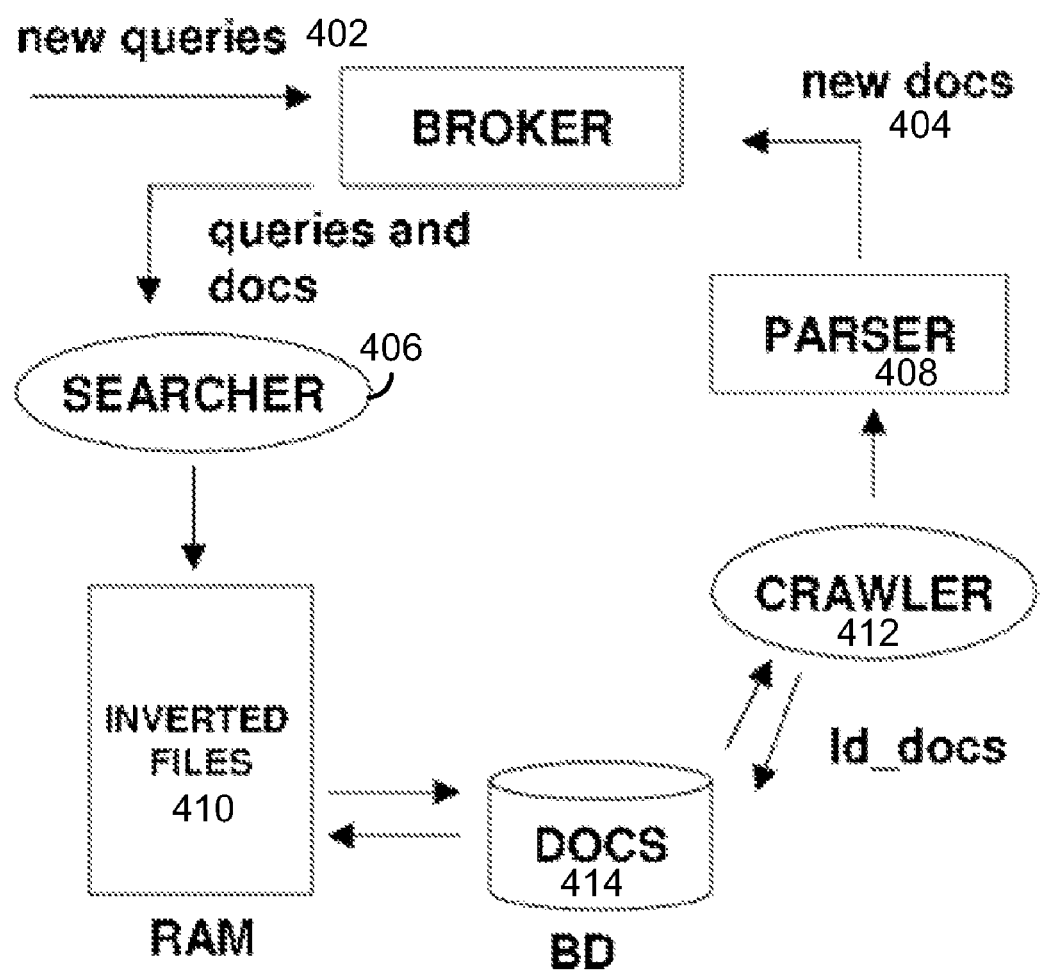
FIG. 4 illustrates use of a timestamp protocol as a part of concurrency control in a synchronous mode of operation.

We now discuss concurrency control with reference to FIG. 4. Read operations come in the form of queries 402 submitted to the search engine and write operations come in the form of new documents 404 added to the text collection (by use of a crawler 412, for example, crawling an available source 414 of documents such as documents accessible via the world wide web) in an on-line manner. That is, the insertions are embedded into the main stream of user queries in an unpredictable arrival order but with query results respecting causality.

In one example, the timestamp protocol is a significant part of concurrency control. A first point to note is that the semantics of supersteps indicate that all messages are in their target processors at the start of each superstep. That is, no messages are in transit at that instant and all the processors are barrier synchronized. The broker assigns a correlative timestamp to every query and document that it sends to the processors, so it suffices to process all messages in timestamp order in each processor to avoid R/W conflicts. To this end, every processor maintains its input message queue organized as a priority queue with keys given by id query integer values (timestamps). The broker selects, in a circular manner, the processors of the "searcher" 406 to send documents and queries. Upon reception of a document, the respective processor parses the document (408) to extract all the relevant terms.

In the document partitioned inverted file 410, the posting lists of all the parsed terms are updated locally in the same processor. However, this is not effected in the current superstep but, rather, in the next superstep. This is in order to wait for the arrival of broadcast terms belonging to queries placed in the same superstep, which can have timestamps earlier than the one associated with the current document insertion operation. To this end, in one example, the processor sends to itself a message in order to wait one superstep before proceeding with the updating of the posting lists.

In the term partitioned inverted file the arrival of a new document to a processor is relatively more demanding of communication resources. This because once the document is parsed a pair (id doc, frequency) for each term is sent to the respective processor holding the posting list. However, insertion of a new document is expected to be comparatively less frequent than queries in real-life settings.

A complication may arise from the fact that the processing of a given query can take several iterations (supersteps). By design of the example, a given pair (id doc, frequency) cannot be inserted in its posting list by a write operation with timestamp later than the query being solved throughout several iterations. This time ordering constraint is addressed in one example by keeping aside the pair for those queries and logically including the pair in the posting list for queries with timestamps later than the timestamp associated with the pair. In practice, then, the pair may be actually inserted in the posting list in frequency descending order, but that pair is not considered by queries with earlier timestamps. Garbage collection can be made periodically (i.e., every certain number of supersteps) or every so often by performing a parallel prefix operation in order to determine the latest timestamp among the fully completed query timestamps at the given superstep.

We now discuss exclusive write supersteps, which is an example of a strategy in which the broker controls the order in which the queries and documents are sent to the cluster processors. In an example, write operations associated with each new document are granted exclusive use of the cluster. That is, upon reception of a new document, the broker waits for the current queries in the cluster to be completed and queues up all new arriving queries and documents. Then the broker sends the new document to the cluster, where the document is indexed and the respective posting lists are updated. Once these write operations have finished, the broker lets the next set of queued read operations be processed in the cluster, until there is a next document to index, and so on. This strategy can be best suited for the case in which the search engine is operating in the Async mode.

Figure 5:
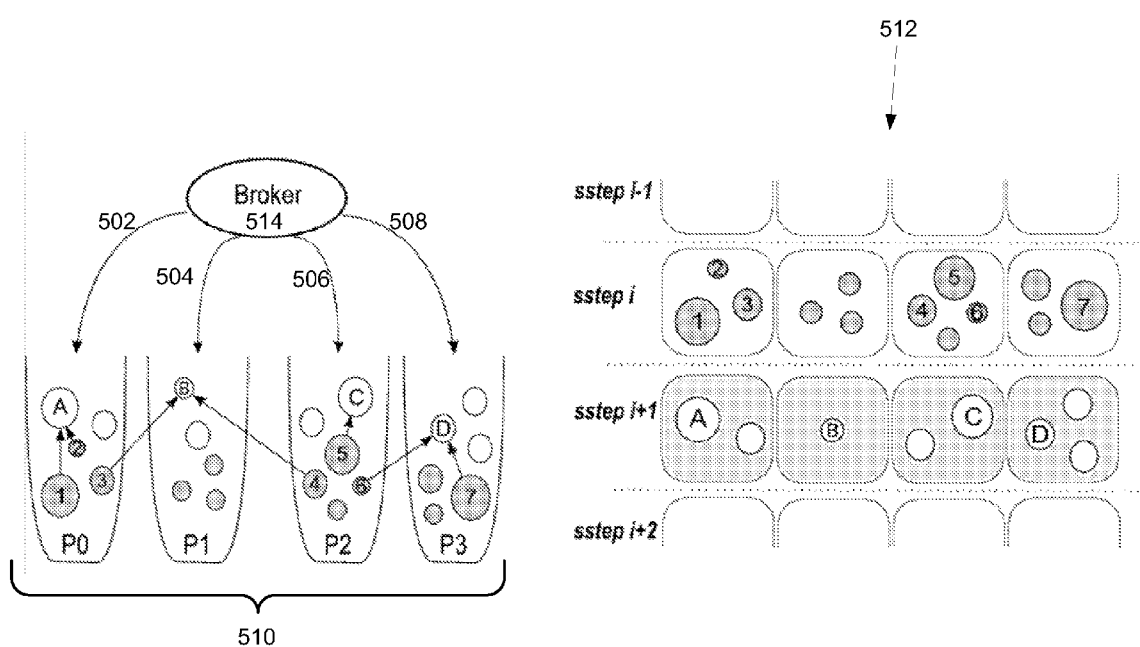
FIG. 5 illustrates the concept of bulk-synchronous parallel (BSP) cost of list fetching and ranking in the term partitioned index and the involved supersteps used to respond to various example queries.

We now discuss load balancing relative to FIG. 5. FIG. 5 illustrates an example of determining the BSP cost of list fetching and ranking in the term partitioned index and the involved supersteps used to solve the queries A, B, C and D using a term partitioned index distributed on four processors. The size of circles in FIG. 5 represents the amount of work predicted to be demanded by the query. Grey circles represent list fetching operations whereas white circles represent ranking operations.

A key point in the use of a scheduling algorithm is, generally, properly representing the actual load to be imposed onto the processors. For the distributed inverted files case, it is preferred to properly represent the cost of disk accesses and document ranking and (very importantly) their relationship. FIG. 5 illustrates an example of BSP computations associated with the processing of four queries 502, 504, 506, 508 using the term partitioned index 510 and the supersteps 512 in which list fetching and ranking take place for a case in which the round-robin query processing method is not used. (In the case of round-robin query processing, a goal is to even out such workload and, thus, each circle would have generally the same radius and large queries are split in several circles of the same radius.)

In the example, the broker 514 uses a BSP cost model to evaluate the cost of its scheduling decisions. The cost of a BSP program can be represented as the cumulative sum of the costs of its supersteps, and the cost of each superstep can be represented as the sum of three quantities: w, hG and L, where w is the maximum of the computations performed by each processor, h is the maximum of the messages sent/received by each processor with each message costing G units of running time, and L is the cost of barrier synchronizing the processors. The effect of the computer architecture is accommodated by the parameters G and L, which are increasing functions of P, the number of processor-memory pairs. The average cost of each access to disk can be represented by a parameter D.

In one example, the broker performs the scheduling by maintaining two windows to account for the processor workload through the supersteps. One window accounts for the ranking operations effected per processor per superstep and the other window accounts for the posting list fetches from disk and also per processor per superstep. In each window cell, the count of the number of operations of each type is kept.

To select the ranker processor for a given query, in one example, two phases are employed. In the first phase, the cost of list fetches is reflected in the window in accordance with the type of inverted file (document or term partitioning). In the second phase, the ranking of document is reflected in the window.

Every decision on where to perform the ranking has an impact in the balance of computation and communication. It is here where a task scheduling algorithm is employed. Each alternative is evaluated with the BSP cost model. The windows reflect the history of previous queries and iterations, and their effect is evaluated with the BSP cost model.

An optimization goal for the scheduling algorithms is now discussed, in accordance with an example. In the example, an upper limit is set to the total number of list fetches allowed to take place in each processor and superstep (in one example, 1.5*R is used, where R is the average number of answers returned for the query). Generally, the processor where the list fetching is to take place cannot be changed, but the fetching can be deferred to one or more later supersteps to avoid imbalance that may result from these operations. This would generally have an effect on the other window, since this also defers the ranking of those documents, which provides the combinations that the scheduling algorithms are in charge to evaluate and select from.

In one example, the optimization goal is to achieve an imbalance of about 15% in the document ranking operation. Imbalance is measured via efficiency, which for a measure X is defined by the ratio average(X)/maximum(X)$\leq$1, over the P processors.

All this is based on the assumption that the broker is able to predict the number of iterations demanded by every query, which generally can be done with cooperation from the search engine. If it is a Sync search engine, then the solution is relatively simple, since the broker can determine what queries were retained for further iterations based on matching the input queries to the answers coming from the search engine. For instance, for a query requiring just one iteration, the answer generally should arrive in two supersteps of the search engine. To this end, the answer messages indicate the current superstep of the search engine and the broker can update its own superstep counter by taking the maximum from these messages.

For fully multi-threaded Async search engines, statistics would generally be collected at the broker side for queries arriving from the search engine. Data for most frequent query terms can be kept cached, whereas other terms are given one iteration initially. If the search engine is implemented using the round robin query processing scheme described above, then the exact number of iterations per query can be calculated for each query. For asynchronous search engines using any other form of query processing, the broker can predict how those computations could have been done by a BSP search engine from the response times for the queries sent to processing.

This can be effected, for example, as now described. For example, the broker may predict the operation of the hypothetical BSP engine every Nq completed queries by assuming that Q=q P new queries are received in each superstep. For this period of Δ units of time, the observed value of Q can be estimated using a G/G/∞ queuing model. Let S be the sum of the differences δq=[DepartureTime−ArrivalTime] of queries, that is the sum of the intervals of time elapsed between the arrival of the queries and the end of their complete processing. Then the average q for the period is given by S/Δ. This because the number of active servers in a G/G/∞ model is defined as the ratio of the arrival rate of events to the service rate of events (λ/μ). If n queries are received by the processor during the interval Δ, then the arrival rate is λ=n/Δ and the service rate is μ=n/S. Then the total number of supersteps for the period is given by Nq/Q and the average running time demanded by every superstep is δs=ΔQ/Nq, so that the number of iterations for any query i is given by δqi/δs.

Assuming that the value of Q is known, the broker can simulate the activities performed in each superstep of the simulated BSP computer. In particular, it can calculate the average efficiency measure described above. Namely, the efficiency for a measure X is defined by the ratio average(X)/maximum(X)≦1, over the P processors, and X stands for the number of ranking operations performed per processor per superstep. This computed efficiency may be used to determine when to switch the search engine to a sync mode of operation. In one example, when the computed efficiency is above 80%, a switch is made to the sync mode of operation.

We have thus described example systems and method to utilize query processing strategies that take advantage of the economy of scale present in the situations in which a large number of queries are solved concurrently. This includes, as an example, a method in which a search engine is controlled to automatically switch between synchronous and asynchronous modes of operation.

Figure 6:
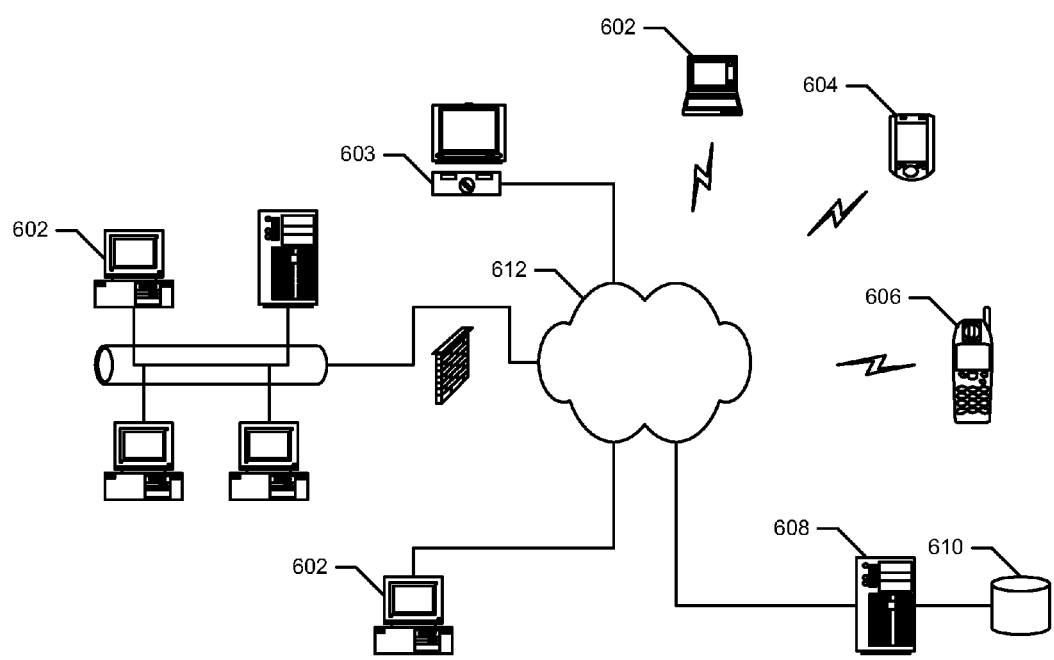
FIG. 6 is a simplified diagram of a network environment in which specific embodiments of the present invention may be implemented.

Embodiments of the present invention may be employed to facilitate evaluation of binary classification systems in any of a wide variety of computing contexts. For example, as illustrated in FIG. 6, implementations are contemplated in which the disclosed methods and systems may exist within a diverse network environment, including any type of computer (e.g., desktop, laptop, tablet, etc.) 602, media computing platforms 603 (e.g., cable and satellite set top boxes and digital video recorders), handheld computing devices (e.g., PDAs) 604, cell phones 606, or any other type of computing or communication platform.

According to various embodiments, applications may be executed locally, remotely or a combination of both. The remote aspect is illustrated in FIG. 6 by server 608 and data store 610 which, as will be understood, may correspond to multiple distributed devices and data stores.

The various aspects of the invention may also be practiced in a wide variety of network environments (represented by network 612) including, for example, TCP/IP-based networks, telecommunications networks, wireless networks, etc. In addition, the computer program instructions with which embodiments of the invention are implemented may be stored in any type of computer-readable media, and may be executed according to a variety of computing models including, for example, on a stand-alone computing device, or according to a distributed computing model in which various of the functionalities described herein may be effected or employed at different locations.

What is claimed is:

1. A method comprising:
   determining an indication of an amount of resources available to a search engine to process a subset of a plurality of search queries;
   selecting the search engine to operate in one of a synchronous mode or an asynchronous mode based on the determined indication and on an arrival rate at which the subset of search queries is received; and
   operating the search engine in accordance with the selected mode to determine at least one document responsive to a given search query of the plurality of search queries.

2. The method of claim 1, further comprising:
   determining a second indication of a second resource amount with respect to a second subset of the plurality of search queries; and
   selecting the search engine to operate in one of the synchronous mode and the asynchronous mode based on the determined second indication or on a second arrival rate at which the second subset of search queries is received.

3. The method of claim 1, wherein:
   the indication of the amount of resources available is determined in accordance with the search engine operating in the synchronous mode.

4. The method of claim 3, wherein:
   the indication of the amount of resources available comprises a determined efficiency; and
   the determined efficiency is based on a number of available active servers operating in the synchronous mode of operation and an available amount of processing time for the available active servers.

5. The method of claim 3, wherein:
   an efficiency is determined based on an estimated number of the search queries to be processed; and
   a simulation of how the estimated number of search queries would be processed is performed using the amount of resources available.

6. The method of claim 1, wherein:
   the indication of the amount of resources available is determined in accordance with the search engine operating as a series of synchronous supersteps.

7. The method of claim 1, wherein:
   when the selected mode comprises the synchronous mode of operation, and access to the resources available is allocated in a round robin manner.

8. The method of claim 1, wherein:
   the resources available include a plurality of processors; and
   in response to the selected mode being the synchronous mode of operation, the resources available are operated in a series of supersteps such that, during a superstep, a processor performs computations on data stored local to the processor or sends one or more messages to other processors of the plurality of processors.

9. The method of claim 8, wherein:
   the superstep ends with a barrier synchronization of the plurality of processors.

10. The method of claim 1, wherein:
    the available resources include a plurality of processors;
    wherein in response to implementation of the synchronous mode of operation, a processor of the plurality of processors operates in a dual role of fetcher and ranker such that, in a fetching role, the fetches posting lists from a local index for a particular search query and, in a ranking role, the processor operates to perform a ranking of documents.

11. A system comprising:
    one or more processors to:
    process a plurality of search queries via a search engine;
    determine an indication of an amount of resources available to the search engine to handle a subset of the plurality of search queries;
    select the search engine to operate in one of a synchronous mode or an asynchronous mode based on the determined indication and on an arrival rate at which the subset of search queries is received; and operate the search engine in accordance with the selected mode to determine at least one document responsive to a given search query of the plurality of search queries.

12. A system of claim 11, the one or more processors to further:

determine a second indication of a second resource amount with respect to a second subset of the plurality of search queries; and select the search engine computing system to operate in one of the synchronous mode and the asynchronous mode based on the determined second indication and on a second arrival rate at which the second subset of search queries is received.

13. The system of claim 11, wherein:

the indication of the amount of resources available is determined in accordance with a search engine operating in a synchronous mode.

14. The system of claim 13, wherein:

the indication of the amount of resources available comprises a determined efficiency; and the determined efficiency is based on a number of available active servers operating in the synchronous mode of operation and an available amount of processing time for the available active servers.

15. The system of claim 13, wherein:

an efficiency is determined based on an estimated number of the search queries to be processed; and a simulation of how the estimated number of the search queries would be processed is performed using the amount of resources available.

16. The system of claim 11, wherein:

the amount of resources available is determined in accordance with the search engine computing system operating as a series of synchronous supersteps.

17. The system of claim 11, wherein:

in response to the selected mode being the synchronous mode of operation, access to the resources available to the search engine are allocated in a round robin manner.

18. The system of claim 11, wherein:

the resources available to the search engine include a plurality of processors; and in response to the selected mode being the synchronous mode of operation, the resources available to the search engine are operated in a series of supersteps such that, during a superstep, a processor performs computations on data stored local to the processor the sends messages to other processors of the plurality of processors.

19. The system of claim 18, wherein:

a superstep is ended with a barrier synchronization of the plurality of processors.

20. The system of claim 11, wherein:

the resources of the search engine include a plurality of processors;

wherein in the synchronous mode of operation, a processor of the plurality of processors operates in a dual role of fetcher and ranker such that, in the fetching role, the processor operates to fetch posting lists from a local index for a particular search query and, in the ranking role, the processor operates to perform a ranking of documents.

21. A device comprising:

one or more processors to:

fetch at least a portion of a posting list corresponding to a first particular query from a local index and send the fetched at least a portion to another of the plurality of processors in response to initiation of processing of a superstep; and process a received portion of the posting list corresponding to a second particular query from a subset of the one or more processors and perform a collective ranking of the received portion of the posting list.

22. The processor of claim 21, further configured to:

provide, to a broker, a result of the collective ranking of the posting list.

* * * * *